US 8,535,428 B2

(12) United States Patent
Inoue et al.

(10) Patent No.: US 8,535,428 B2
(45) Date of Patent: Sep. 17, 2013

(54) SYSTEM FOR RECOVERING CARBON DIOXIDE FROM FLUE GAS

(75) Inventors: Katsufumi Inoue, Kanagawa-ken (JP); Takashi Kamijo, Hiroshima-ken (JP); Tsuyoshi Oishi, Hiroshima-ken (JP); Takahito Yonekawa, Hiroshima-ken (JP); Hiroshi Tanaka, Hiroshima-ken (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 460 days.

(21) Appl. No.: 13/003,682

(22) PCT Filed: Jan. 26, 2009

(86) PCT No.: PCT/JP2009/051197
§ 371 (c)(1),
(2), (4) Date: Jan. 11, 2011

(87) PCT Pub. No.: WO2010/010720
PCT Pub. Date: Jan. 28, 2010

(65) Prior Publication Data
US 2011/0107916 A1    May 12, 2011

(30) Foreign Application Priority Data
Jul. 23, 2008  (JP) ................ 2008-190306

(51) Int. Cl.
*B01D 53/14* (2006.01)
(52) U.S. Cl.
USPC .......... 96/242; 95/173; 95/174; 95/178; 95/183; 95/193; 95/209; 95/236
(58) Field of Classification Search
None
See application file for complete search history.

(56) References Cited

U.S. PATENT DOCUMENTS 3,773,895 A * 11/1973 Thirkell ............ 423/223
3,890,207 A    6/1975 Chapman et al.
(Continued)

FOREIGN PATENT DOCUMENTS

DE   10 2006 012 353 A1   3/2007
EP       0 588 175 A2      3/1994
(Continued)

OTHER PUBLICATIONS

Russian Office Action dated Apr. 10, 2012, issued in corresponding application 2011106649 (3 pages), with English translation (2 pages).
(Continued)

*Primary Examiner* — Duane Smith
*Assistant Examiner* — Pankti Patel
(74) *Attorney, Agent, or Firm* — Westerman, Hattori, Daniels & Adrian, LLP (57) ABSTRACT

To include an absorber (1006) that brings $CO_2$ absorbent that absorbs $CO_2$ contained in flue gas (1002) into contact with the flue gas to remove $CO_2$ from the flue gas, a regenerator (1008) that strips $CO_2$ from $CO_2$ absorbent (rich solution), which is fed from the absorber through a first feed line $L_1$ and has absorbed $CO_2$, to regenerate $CO_2$ absorbent, thereby acquiring regenerated $CO_2$ absorbent (lean solution) (1009), falling film reboilers (1101-1 and 1101-2) that draw off $CO_2$ absorbent (amine solution) (1033) from near the bottom of the regenerator and reheats regenerated $CO_2$ absorbent via steam (1031), a first liquid-vapor separator (1103) that separates the $CO_2$ absorbent reheated by the falling film reboilers into regenerated $CO_2$ absorbent in which $CO_2$ has been removed and vapor containing $CO_2$, and a second feed line $L_2$ for supplying the separated regenerated $CO_2$ absorbent to the absorber.

4 Claims, 7 Drawing Sheets

(56) References Cited

U.S. PATENT DOCUMENTS

| | | | |
|---|---|---|---|
| 4,747,915 A * | 5/1988 | Pagani | 203/89 |
| 5,004,043 A * | 4/1991 | Mucic et al. | 165/118 |
| 5,145,658 A * | 9/1992 | Chao | 423/232 |
| 5,252,187 A * | 10/1993 | Ohtsu et al. | 203/26 |
| 5,603,908 A | 2/1997 | Yoshida et al. | |
| 6,152,994 A * | 11/2000 | Van Grinsven et al. | 95/179 |
| 6,479,689 B1 | 11/2002 | Tojo et al. | |
| 2001/0014763 A1* | 8/2001 | Ueoka et al. | 568/869 |
| 2006/0248890 A1* | 11/2006 | Iijima et al. | 60/645 |
| 2007/0084344 A1* | 4/2007 | Moriya et al. | 95/210 |
| 2009/0282865 A1* | 11/2009 | Martinez et al. | 62/620 |
| 2011/0014100 A1* | 1/2011 | Bara et al. | 423/229 |
| 2012/0024689 A1* | 2/2012 | Schmidtke et al. | 203/29 |

FOREIGN PATENT DOCUMENTS

| | | | |
|---|---|---|---|
| EP | 1 174 406 A1 | | 1/2002 |
| JP | 6-091134 A | | 4/1994 |
| JP | 9-155141 A | | 6/1997 |
| JP | 11-217339 A | | 8/1999 |
| JP | 2001-521018 A | | 11/2001 |
| JP | 2002-062080 A | | 2/2002 |
| JP | 2004-190945 A | | 7/2004 |
| JP | 3716195 B2 | | 11/2005 |
| JP | 2007-105683 A | | 4/2007 |
| JP | 2007-284273 A | | 11/2007 |
| JP | 2008-029976 A | | 2/2008 |
| SU | 1296202 A1 | | 3/1987 |
| WO | 99/21821 A1 | | 5/1999 |
| WO | 00/51954 A1 | | 9/2000 |
| WO | 2007/075400 A2 | | 7/2007 |

OTHER PUBLICATIONS

European Search Report dated Apr. 5, 2012, issued in corresponding European Patent Application No. 09800236.3, (8 pages).

Russian Decision to Grant dated Aug. 28, 2012, issued in corresponding Russian Application No. 2011106649, 6 pages.

Notice of Allowance dated Oct. 17, 2012, issued in Canadian Patent Application No. 2,730,322 (1 page).

Notice of Acceptance dated Jan. 9, 2013, issued in corresponding Australian patent application No. 2009275063.

International Search Report of PCT/JP2009/051197, mailing date May 12, 2009.

Written Opinion of PCT/JP2009/051197, mailing date May 12, 2009.

* cited by examiner

SYSTEM FOR RECOVERING CARBON DIOXIDE FROM FLUE GAS

TECHNICAL FIELD

The present invention relates to a system for recovering carbon dioxide from flue gas, in which a reboiler of a regenerator can be compactly installed, thermal decomposition of amine solution become small, and power of a $CO_2$ compressor can be reduced.

BACKGROUND ART

Greenhouse effect due to $CO_2$ has been pointed out as a cause of global warming in recent years, and a measure against it has become an urgent issue internationally for protecting the global environment. Generation sources of $CO_2$ include all sorts of human activity areas that burn fossil fuel, and demands for the reduction of discharge thereof are further increasing. Accompanying this trend, a method of removing and recovering $CO_2$ in combustion flue gas by bringing combustion flue gas in a boiler into contact with amine $CO_2$ absorbent, and a method of storing recovered $CO_2$ without discharging it to the air have been strenuously researched, with regard to power generation facilities such as a thermal power plant that uses a large amount of fossil fuel.

As a process of eliminating and recovering $CO_2$ in combustion flue gas by using the $CO_2$ absorbent, a process in which combustion flue gas is brought into contact with the $CO_2$ absorbent in an absorber, and a process in which the absorbent having absorbed $CO_2$ is heated in a regenerator to release $CO_2$ and regenerate the absorbent so that the absorbent is circulated and reused in the absorber have been adopted (see, for example, Patent Documents 1 and 2).

Figure 4:
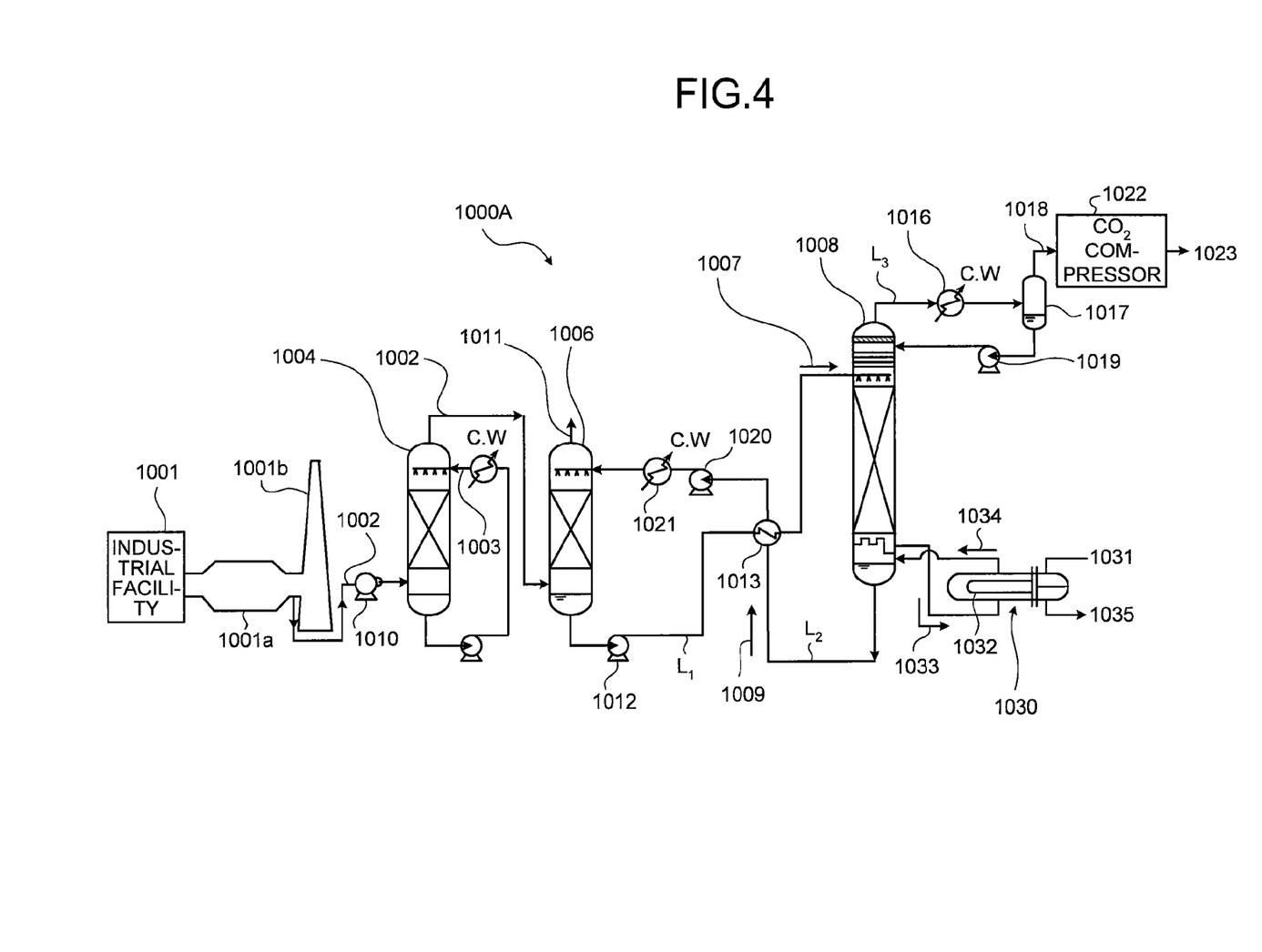
FIG. 4 is a schematic diagram of a system for recovering carbon dioxide from flue gas according to a conventional technique.

As shown in FIG. 4, a conventional $CO_2$ recovering system 1000A has such a configuration that flue gas 1002 containing $CO_2$ exhausted from industrial facilities 1001 such as a boiler is cooled by cooling water 1003 in a cooling column 1004, and the cooled flue gas 1002 containing the $CO_2$ is brought into countercurrent contact with $CO_2$ absorbent containing alkanolamine as a base (amine solution) in an absorber 1006, with $CO_2$ in the flue gas 1002 being absorbed by the $CO_2$ absorbent, thereby eliminating $CO_2$ from the flue gas 1002. The $CO_2$ absorbent having absorbed $CO_2$ (rich solution) 1007 releases $CO_2$ in a regenerator 1008, so that most of $CO_2$ is removed until reaching a bottom part of the regenerator 1008, to regenerate the absorbent as lean solution 1009. The regenerated lean solution 1009 is fed again to the absorber 1006 as the $CO_2$ absorbent (amine solution) and reused.

In FIG. 4, reference letter or numeral 1001a denotes a flue gas duct of the industrial facilities 1001 such as a boiler and a gas turbine, 1001b denotes a chimney having a damper therein, 1010 denotes a blower that supplies flue gas, 1011 denotes purged gas in which $CO_2$ has been removed, 1012 denotes a feed pump for the rich solution 1007 provided on a first feed line $L_1$, 1013 denotes a heat exchanger that heat-exchanges the rich solution 1007 with the lean solution 1009, $L_3$ denotes a $CO_2$ discharge line, 1016 denotes a condenser that condenses water vapor, 1017 denotes a liquid-vapor separator that separates carbon dioxide ($CO_2$) 1018, 1019 denotes a pump for returning the amine solution entrained after $CO_2$ removal to the regenerator 1008, 1020 denotes a pump provided on a second feed line $L_2$ to feed the lean solution 1009, and 1021 denotes a cooling system that cools the lean solution 1009.

The carbon dioxide ($CO_2$) recovered is compressed by a $CO_2$ compressor 1022, thereby acquiring high-pressure $CO_2$ gas 1023 of 10.0 to 15.0 megapascals (G).

The $CO_2$ recovering system can be provided afterwards for recovering $CO_2$ from an existing flue gas source, or can be provided at the same time of newly installing a flue gas source.

A reboiler for evaporating a part of the extracted amine solution is installed at the bottom of the regenerator 1008. The evaporated equilibrium vapor becomes stripping vapor for giving energy for amine-$CO_2$ dissociation.

Because the amine solution for absorbing $CO_2$ is not tolerant to heat and is decomposed at a high temperature, although a high temperature is desired in view of stripping performance. Therefore, the regenerator 1008 operated at a temperature as low as possible, taking thermal decomposition into consideration. A reboiler heat source is also limited up to 150° C.

In view of avoiding decomposition, it is preferred that a contact time of the amine solution with the heat source is as short as possible.

As a type of the reboiler, a horizontal thermo-siphon reboiler and a kettle-type reboiler have been conventionally used.

In FIG. 4, an example of using a horizontal thermo-siphon reboiler 1030 is shown.

The horizontal thermo-siphon reboiler 1030 has a heat-transfer tube 1032 to which low-pressure steam 1031 is supplied. The heat-transfer tube 1032 heats $CO_2$ absorbent (amine solution) 1033 extracted from the regenerator 1008, separates carbon dioxide therein, and returns it to inside of the regenerator 1008 as gas-liquid two phase flow 1034. Reference numeral 1035 denotes condensed water.

The horizontal thermo-siphon reboiler 1030 is normally used as a reboiler of a distillation column. However, it has a problem that evaporated vapor and liquid become mixed phase gas-liquid two phase flow 1034 to pass through the heat exchanger and an outlet piping, thereby increasing flow resistance. Therefore, a boiling point rise of 2 to 5° C. occurs in the heat exchanger.

As a result, thermal decomposition of the amine solution therein becomes a problem.

Figure 6:
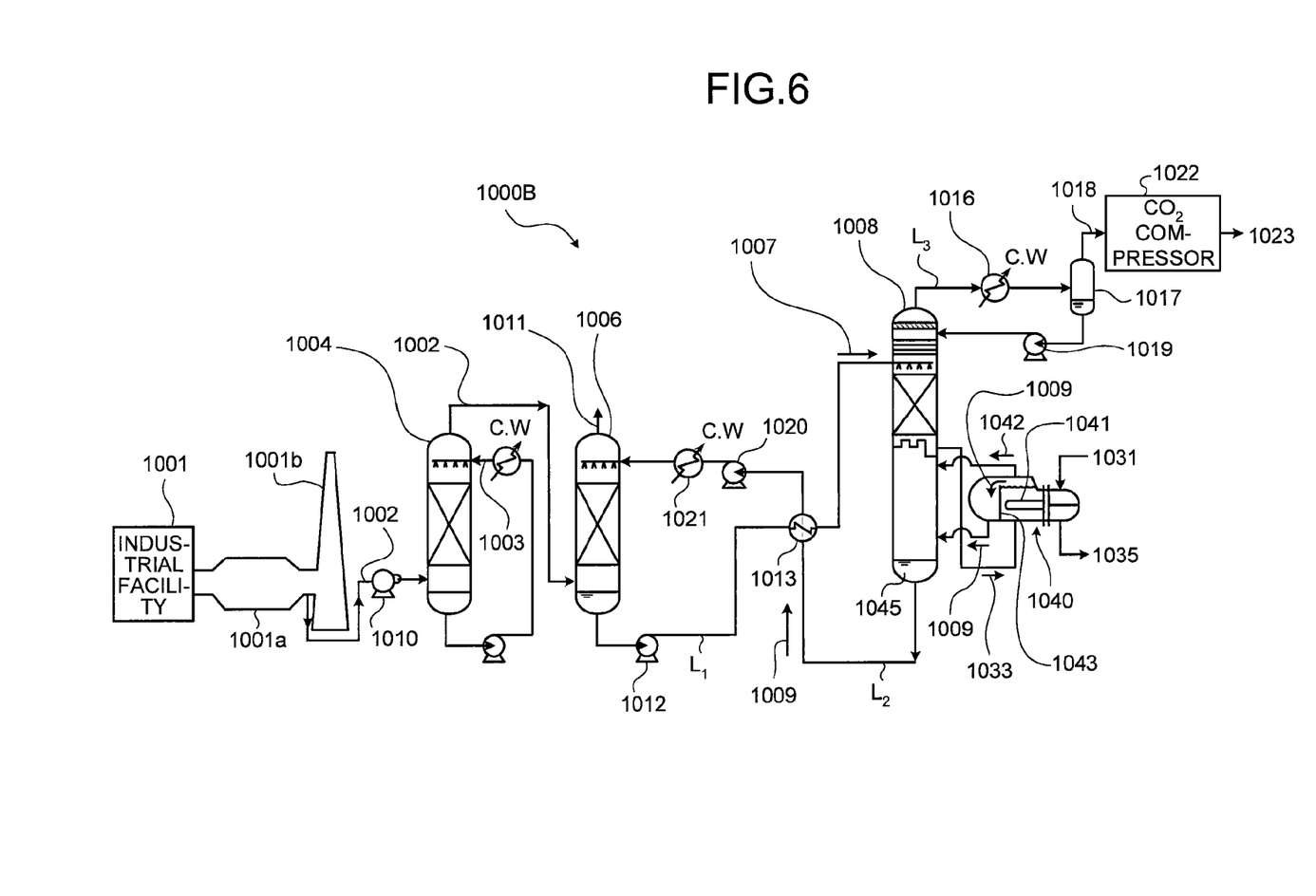
FIG. 6 is a schematic drawing of another system for recovering carbon dioxide from flue gas according to a conventional technique.

To suppress the boiling point rise, there is a case that a kettle-type reboiler 1040 is installed instead of the horizontal thermo-siphon reboiler 1030, as shown in a $CO_2$ recovering system 1000B in FIG. 6.

The kettle-type reboiler 1040 heats the amine solution 1033 by using a heat-transfer tube 1041, to which low-pressure steam 1031 is supplied, separates carbon dioxide therein, extracts it as vapor 1042 containing carbon dioxide from the top of the kettle-type reboiler 1040, and returns it to the inside of the regenerator 1008.

In the kettle-type reboiler 1040, the separated lean solution 1009 is separated by a gate 1043, and returned to a liquid residence section 1045 of amine solution at the bottom of the regenerator 1008.

In the kettle-type reboiler 1040, the evaporated vapor 1042 and the lean solution 1009 are separated in the heat exchanger and does not form vapor-liquid mixed phase at the outlet piping, and thus most of the flow resistance is only in a heat exchanger tube bundle. The boiling point rise for this is approximately from 0.2 to 1° C. However, a very large shell diameter is required for vapor-liquid separation and a residence time thereof becomes long.

A chemical reaction rate becomes twice when the temperature increases by 10° C., and thus it is preferred that the residence time in the kettle-type reboiler 1040 is as short as possible.

It is also preferred that the pressure is as low as possible, because the regenerator 1008 is operated at a low temperature for suppressing decomposition. However, because the recovered $CO_2$ is compressed in multi stages, by increasing the pressure on a suction side, compression power of the $CO_2$ compressor 1022 can be reduced. Therefore, an efficient regeneration system has been desired.

Patent Document 1: Japanese Patent Application Laid-open No. H06-91134

Patent Document 2: Japanese Patent No. 3716195

DISCLOSURE OF INVENTION

Problem to be Solved by the Invention

As an effective use of carbon dioxide in flue gas, conventionally, a part of carbon dioxide in the flue gas is only recovered to produce carbon dioxide for carbonated drink and dry ice. Recently, however, a greenhouse effect due to carbon dioxide has been pointed out as a cause of global warming, and a measure against it becomes imperative internationally for protecting global environment, and generation sources of carbon dioxide include all sorts of human activity areas that burn fossil fuel, and demands for reduction of discharge thereof are further increasing. Accompanying this trend, a method of removing and recovering the entire amount of $CO_2$ in combustion flue gas by bringing combustion flue gas in industrial facilities such as a boiler and a gas turbine into contact with $CO_2$ absorbent, and a method of compressing and storing recovered $CO_2$ without discharging it to the air have been tested, with regard to power generation facilities such as a thermal power plant that uses a large amount of fossil fuel, and a technique for recovering carbon dioxide having high energy efficiency of the entire system has been eagerly desired.

Further, conventionally, use of carbon dioxide means production of dry ice and the like, and the production thereof can be realized sufficiently by using the horizontal thermo-siphon reboiler and the kettle-type reboiler. However, there are following problems when a large amount of carbon dioxide in large facilities is recovered, compressed, and stored.

1) In Case of Horizontal Thermo-Siphon Reboiler

Boiling point rise occurs due to flow resistance at the time of passing through a tube bundle of the heat-transfer tube 1032 provided in the horizontal thermo-siphon reboiler 1030, and thermal decomposition of amine solution is likely to occur. Therefore, absorption of carbon dioxide cannot be maintained stably for a long time.

Further, due to the boiling point rise, a temperature difference between a heat source which is a driving force of heat transfer and amine solution decreases.

Furthermore, due to the boiling point rise, heat transfer becomes such that convection heat transfer with a small heat transfer coefficient is performed up to a boiling point and boiling heat transfer with a large heat transfer coefficient is performed after having reached the boiling point. Therefore, there is a problem that a heat-transfer area of the reboiler increases, leading to size increase of the system.

If an operation pressure is decreased, anticipating the boiling point rise, the power of the $CO_2$ compressor 1022 increases and, for example, there is a problem that the system efficiency in the entire power generation facilities decreases.

For example, in a system in which 110-MW power generation facilities are used, when exhausted carbon dioxide is to be recovered, plural (at least four) reboilers need to be appropriately arranged around the regenerator 1008, to maintain reboiler performance. However, if the $CO_2$ recovering system becomes larger, the size of the reboilers also become larger, and thus a very large installation area (250 $m^2$) is required.

The principle of circulating a horizontal thermo-siphon reboiler is such that a liquid head difference due to a density difference of vapor-liquid mixed phase fluid by a liquid head due to liquid density at an inlet of a horizontal thermo-siphon reboiler and vapor generated at an outlet thereof is used as a driving force, and pressure losses due to flow resistance at a tube bundle, inlet liquid piping, and outlet mixed phase piping in the reboiler are balanced. The heat transfer performance depends on the balancing situation, and when the balancing situation is not appropriate, predetermined heat transfer performance cannot be obtained.

Therefore, the horizontal thermo-siphon reboiler needs to be designed appropriately, taking into consideration the diameters, positions, height, and shapes of an amine-solution draw off nozzle of the regenerator, reboiler inlet, reboiler outlet nozzles, and connecting piping from the reboiler to the regenerator.

Therefore, at the time of recovering a large amount of carbon dioxide, when plural horizontal thermo-siphon reboilers 1030 are installed, it is important in view of flow and heat transfer performances to evenly distribute the amine solution 1033 from the regenerator 1008 to the horizontal thermo-siphon reboilers 1030. It becomes more complicated and difficult to appropriately arrange the connecting piping in this case than in the case of installing a single horizontal thermo-siphon reboiler 1030.

Figure 5:
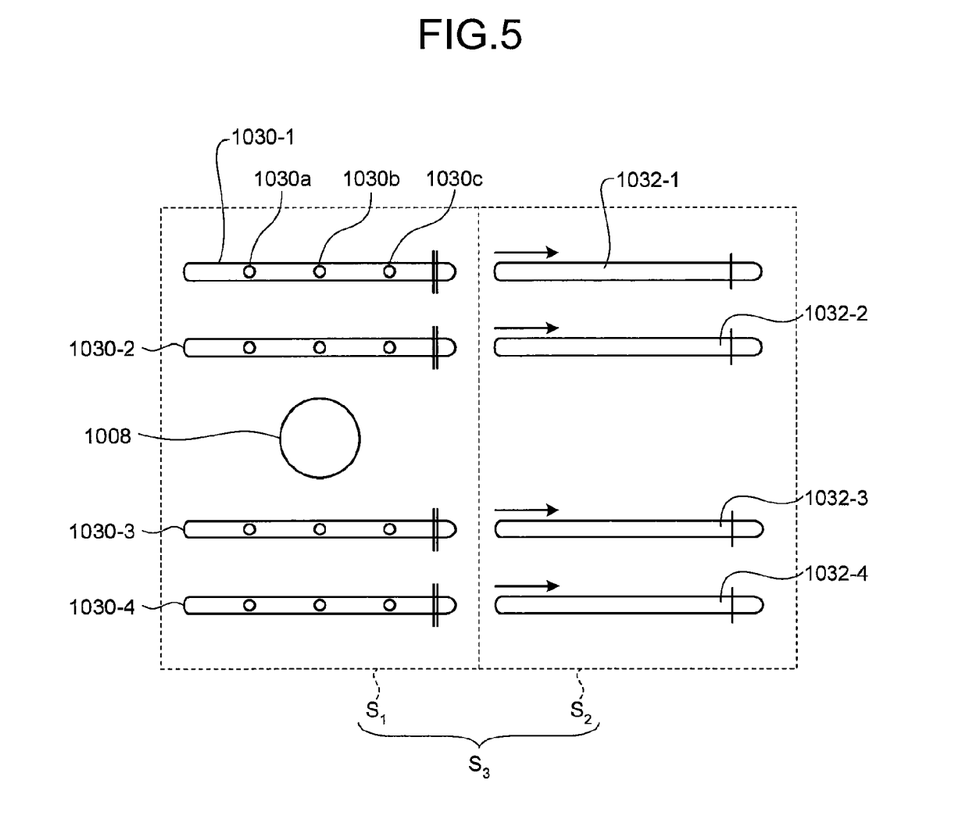
FIG. 5 is a schematic drawing of a site area of a reboiler shown in FIG. 4.

Further, at the time of maintenance of the horizontal thermo-siphon reboiler 1030, at the time of inspection, and at the time of cleaning when outside of the heat-transfer tube 1032 becomes dirty, and as shown in FIG. 5, when four thermo-siphon reboilers 1030-1 to 1030-4 are installed, tube bundles of the four heat-transfer tubes 1032-1 to 1032-4 need to be pulled out, and pulling out of the tube bundles becomes difficult with an increase in the reboiler size. In FIG. 5, reference letter or numeral 1030a to 1030c denote attaching parts of a piping for supplying the gas-liquid two phase flow 1034 to the regenerator 1008.

That is, for example, in the case of a $CO_2$ recovering system of 110-MW power generation facilities, 1800 tubes are required for one $CO_2$ recovering system, and an operation for pulling out these tubes becomes difficult due to heavy weight thereof, and deflection at the time of pulling out the tube bundle of about 12 meters becomes a problem.

Further, at the time of pulling out the tube bundle, a maintenance site for a pulling-out operation (more than double the installation area) is required. That is, a total area $S_3$ (500 $m^2$) of a site area $S_1$ (250 $m^2$) for installation and a maintenance site area $S_2$ (250 $m^2$) is required, and when there is no large spare space in the site, installation of a $CO_2$ recovering system becomes difficult in existing large boiler facilities.

2) In Case of Kettle-Type Reboiler

In the kettle-type reboiler 1040, a shell diameter increases due to vapor-liquid separation, and the residence time in the reboiler including the heat source increases, thereby increasing decomposition.

Further, to maintain the reboiler performance, plural kettle-type reboilers need to be appropriately arranged around the regenerator 1008. However, if the $CO_2$ recovering system becomes larger, the kettle-type reboiler 1040 also becomes larger than the horizontal thermo-siphon reboiler 1030. Further, because the outlet piping is not for the vapor-liquid mixed phase flow, the arrangement complexity and difficulty of piping is slightly alleviated than in the horizontal thermo-siphon reboiler 1030; however, a problem on designing still remains.

Figure 7:
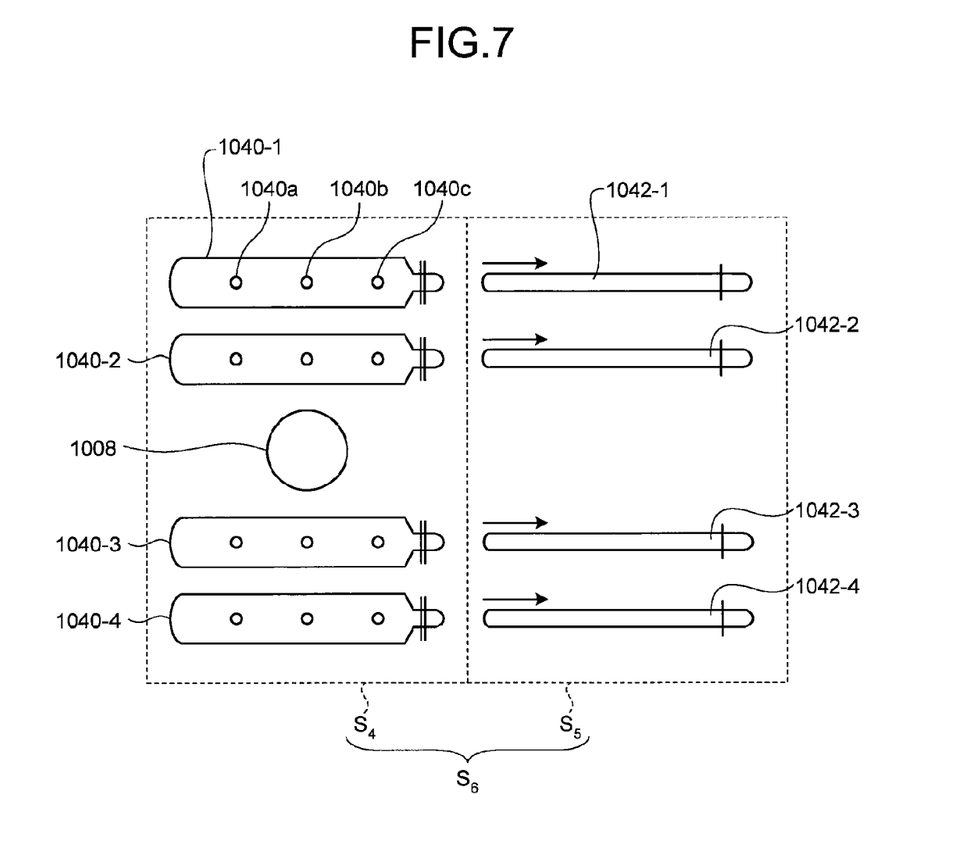
FIG. 7 is a schematic diagram of a site area of a reboiler shown in FIG. 6.

Further, as shown in FIG. 7, there is required an installation area ($S_1<S_4=280$ m$^2$), which is much larger than that in the case of the horizontal thermo-siphon reboiler 1030.

Reference letter or numeral 1040-1 to 1040-4 denote four kettle-type reboilers, 1042-1 to 1042-4 denote four heat-transfer tubes, and 1040a to 1040c denote attaching parts of piping for supplying vapor 1042 to the regenerator 1008.

Further, at the time of maintenance, as in the horizontal thermo-siphon reboiler 1030, the tube bundle needs to be pulled out at the time of inspection and at the time of cleaning the tube. However, if the tube bundle becomes large, the tube bundle is hard to be pulled out. Further, the maintenance site for a pulling-out operation is required (more than double the installation area ($S_4$ (280 m$^2$)+$S_5$ (280 m$^2$)=$S_6$ (560 m$^2$) is required).

The present invention has been achieved in view of the above problems, an object of the present invention is to provide a system for recovering carbon dioxide from flue gas, in which a reboiler of a regenerator can be compactly installed, thermal decomposition of amine solution is small, and power of a CO$_2$ compressor can be reduced.

Means for Solving Problem

According to an aspect of the present invention, a system for recovering carbon dioxide from flue gas includes: an absorber that brings CO$_2$ absorbent that absorbs CO$_2$ contained in flue gas exhausted from industrial facilities into contact with the flue gas to remove CO$_2$ from the flue gas; a regenerator that strips CO$_2$ from CO$_2$ absorbent that is fed from the absorber through a first feed line and has absorbed the CO$_2$ to regenerate CO$_2$ absorbent; at least two falling film reboilers that draw off CO$_2$ absorbent from near a bottom of the regenerator and reheats CO$_2$ absorbent via steam; a first liquid-vapor separator that separates CO$_2$ absorbent reheated by the falling film reboilers into CO$_2$ absorbent and vapor containing CO$_2$; and a second feed line for supplying separated CO$_2$ absorbent to the absorber.

Advantageously, the system for recovering carbon dioxide from flue gas further includes: a condenser that condenses water vapor from CO$_2$ gas carrying water vapor, extracted from a top part of the regenerator; a second liquid-vapor separator that separates condensed water vapor; and a CO$_2$ compressor that compresses CO$_2$ gas separated by the second liquid-vapor separator to acquire high-pressure CO$_2$ gas.

Advantageously, in the system for recovering carbon dioxide from flue gas, the falling film reboiler includes a channel cover for maintenance provided on an upper part thereof.

Advantageously, in the system for recovering carbon dioxide from flue gas, a reboiler system is constituted by the at least two falling film reboilers and one first liquid-vapor separator that separates falling liquid from the falling film reboilers into vapor and liquid, and a plurality of the reboiler systems are arranged for one regenerator.

Effect of the Invention

According to the present invention, because regenerated CO$_2$ absorbent is reheated by a falling film reboiler, decomposition of the absorbent is reduced, and because the reboiler is made compact, an installation area of facilities can be made small. Further, because piping also becomes simple, installation thereof can be facilitated.

Further, because there is no boiling point rise within the reboiler, the pressure can be increased by 30 kilopascals than in conventional thermo-siphon reboilers, thereby enabling to reduce the power of a CO$_2$ compressor.

EXPLANATIONS OF LETTERS OR NUMERALS

1001 industrial facility
1002 flue gas
1006 absorber
1007 CO$_2$ absorbent having absorbed CO$_2$ (rich solution)
1008 regenerator
1009 regenerated CO$_2$ absorbent (lean solution)
1100 system for recovering carbon dioxide from flue gas
1101 falling film reboiler
1103 first liquid-vapor separator
1022 CO$_2$ compressor
1023 high-pressure CO$_2$ gas

BEST MODE(S) FOR CARRYING OUT THE INVENTION

The present invention is explained below in detail with reference to the accompanying drawings. The present invention is not limited to the embodiments. In addition, constituent elements in the following embodiments include those that can be easily assumed by persons skilled in the art or that are substantially equivalent.

Embodiment

A system for recovering carbon dioxide from flue gas according to an embodiment of the present invention is explained with reference to the drawings.

Figure 1:
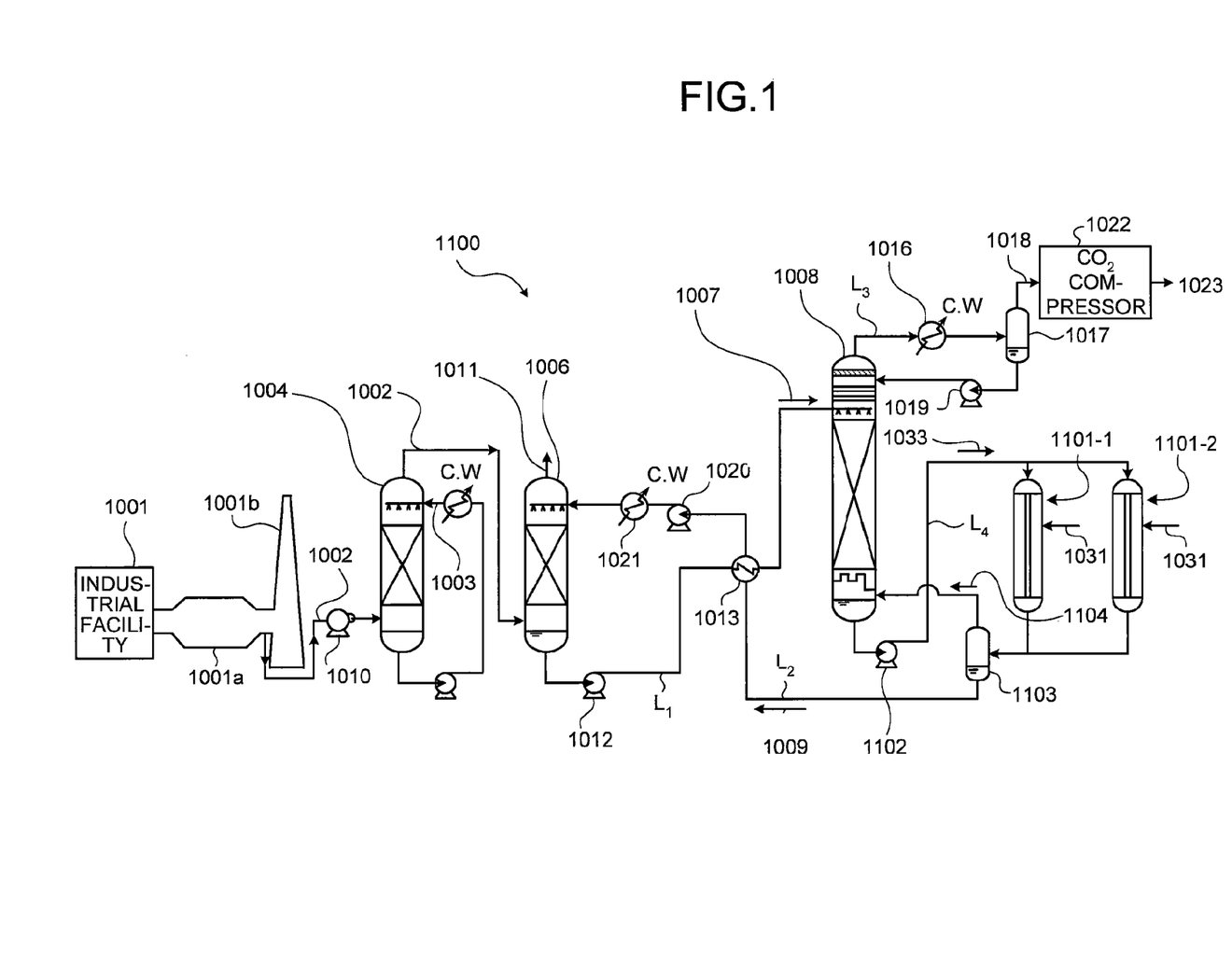
FIG. 1 is a schematic diagram of a system for recovering carbon dioxide from flue gas according to an embodiment of the present invention.

FIG. 1 is a schematic diagram of the system for recovering carbon dioxide from flue gas according to the present embodiment.

As shown in FIG. 1, a system for recovering carbon dioxide from flue gas 1100 according to the present embodiment includes the absorber 1006 that brings CO$_2$ absorbent that absorbs CO$_2$ contained in the flue gas 1002 exhausted from industrial facilities 1001 into contact with the flue gas 1002 to remove CO$_2$ from the flue gas 1002, the regenerator 1008 that strips $CO_2$ from $CO_2$ absorbent (rich solution) 1007, which is fed from the absorber 1006 through a first feed line $L_1$ and has absorbed $CO_2$, to regenerate $CO_2$ absorbent, thereby acquiring the regenerated $CO_2$ absorbent (lean solution) 1009, two or more falling film reboilers 1101-1 and 1101-2 that draw off regenerated $CO_2$ absorbent (amine solution) 1033 from near the bottom of the regenerator 1008 through a third feed line $L_4$ and reheats regenerated $CO_2$ absorbent 1033 via steam 1031, a first liquid-vapor separator 1103 that separates falling liquid of the $CO_2$ absorbent reheated by the falling film reboilers 1101-1 and 1101-2 into the regenerated $CO_2$ absorbent (lean solution) 1009 in which $CO_2$ has been removed and vapor 1104 containing $CO_2$, a second feed line $L_2$ for supplying the separated regenerated $CO_2$ absorbent 1009 to the absorber 1006, a condenser 1016 that condenses water vapor from $CO_2$ gas carrying water vapor, drawn off from a top part of the regenerator 1008, a second liquid-vapor separator 1017 that separates condensed water vapor, and the $CO_2$ compressor 1022 that compresses $CO_2$ gas separated by the second liquid-vapor separator 1017 to acquire the high-pressure $CO_2$ gas 1023.

In FIG. 1, reference numeral 1102 denotes a pump that feeds the regenerated $CO_2$ absorbent (amine solution) 1033 to the falling film reboiler 1101.

In the present embodiment, the system can be made compact by applying the falling film reboiler 1101 to a reboiler of the regenerator 1008.

Figure 2A:
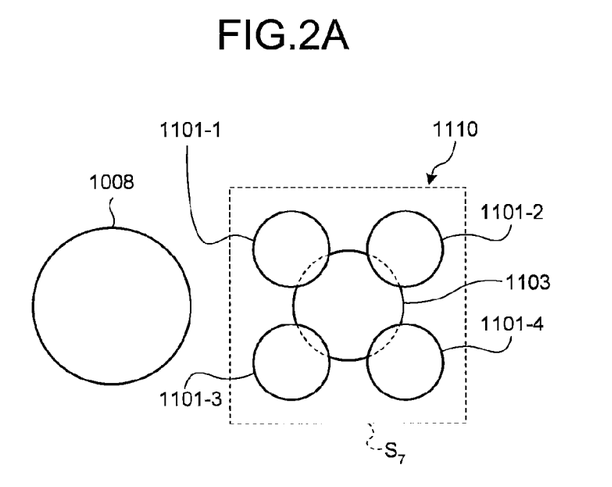
FIG. 2A is a schematic drawing of a site area of the system for recovering carbon dioxide.

That is, as shown in FIG. 2A, as the size of the carbon-dioxide recovering system becomes large, a reboiler system 1110 in which two to eight (four in the present embodiment) falling film reboilers 1101-1 to 1101-4 are arranged and one first liquid-vapor separator 1103 is arranged below the falling film reboilers can be compactly arranged as a module adjacent to one regenerator 1008.

Figure 2B:
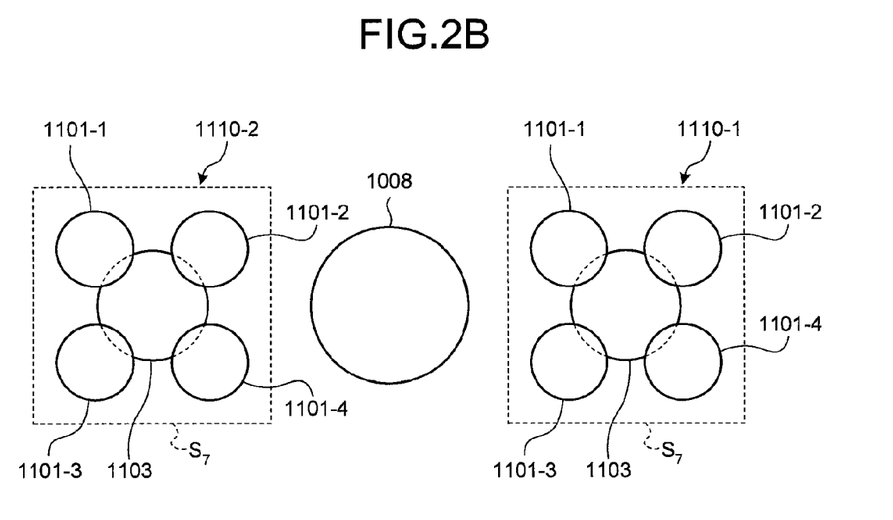
FIG. 2B is another schematic drawing of a site area of the system for recovering carbon dioxide.

Further, as shown in FIG. 2B, plural reboiler systems 1101 (two sets in the present embodiment) can be arranged for one regenerator 1008.

That is, because one or plural falling film reboilers 1101 are arranged for one first liquid-vapor separator 1103, the reboiler system is established adjacent to one regenerator 1008, and thus piping becomes simple.

On the other hand, in a case of a conventional horizontal thermo-siphon boiler 1030, when plural reboilers are arranged, complicated piping for evenly distributing the reboilers is required. However, in the present invention, even when plural falling film reboilers 1101 are arranged, it is basically sufficient to provide one first liquid-vapor separator 1103, and thus one piping for the vapor 1104 to be returned to the regenerator 1008 is sufficient.

The regenerated $CO_2$ absorbent (amine solution) 1033 is supplied from the regenerator 1008 to an top of the falling film reboiler 1101 via the pump 1102. While the regenerated $CO_2$ absorbent (amine solution) 1033 flows down through a thin film inside a tube, $H_2O$-based equilibrium vapor is generated, and vapor flows out downward through the center of the tube. At this time, because liquid head and liquid-vapor head do not come in contact therewith, boiling point rise hardly occurs.

In the falling film reboiler 1101 according to the present embodiment, because boiling point rise does not occur, the pressure therein can be increased by about 30 kilopascals than in the conventional horizontal thermo-siphon boiler 1030 as shown in FIG. 4, and power of the $CO_2$ compressor 1022, which is a $CO_2$ cooling compression system, can be reduced by about 4% to 5%.

Accordingly, power of the pump 1102 that supplies amine solution to the upper part of the falling film reboiler 1101 can be sufficiently compensated.

For example, when $CO_2$ is recovered from flue gas from a 110-MW class power plant, efficiency thereof is improved by 0.1% to 0.2% after subtracting the pump power.

Figure 3:
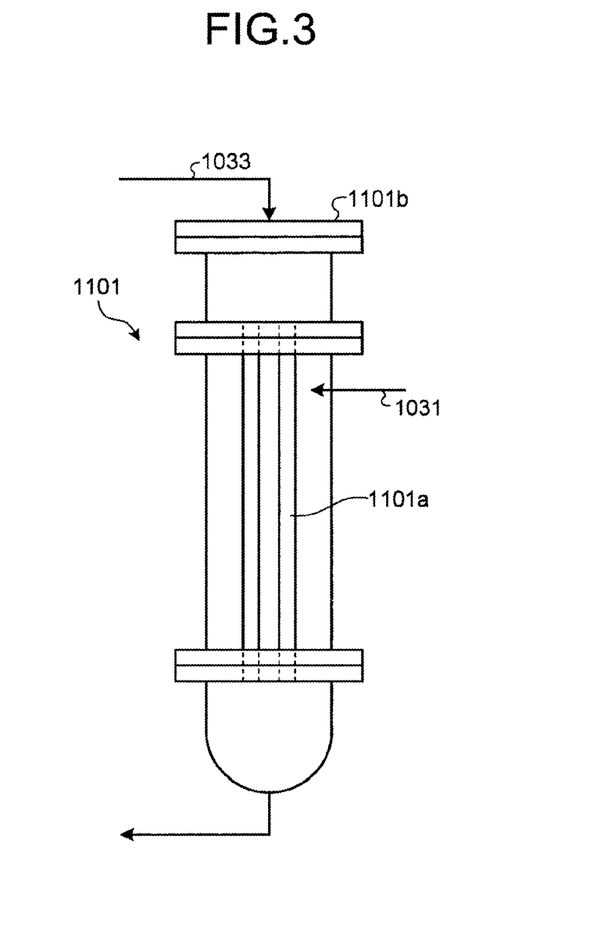
FIG. 3 is a schematic drawing of a falling film reboiler.

As shown in FIG. 3, at the time of cleaning a tube 1101a of the falling film reboiler 1101, the tube 1101a can be easily cleaned by removing a channel cover 1101b for maintenance provided on the top of the falling film reboiler 1101. Further, cleaning can be easily performed without pulling out the tube bundle as in the conventional horizontal thermo-siphon boiler 1030 and the kettle-type reboiler 1040.

In the falling film reboiler 1101, in the case of the 110-MW class power plant, a residence time can be largely reduced to about 7 seconds with respect to about 150 seconds in the case of the kettle-type reboiler 1040, and an amount of decomposition is reduced to about ½0, assuming that the temperature in the reboiler is the same.

According to the present invention, in facilities for recovering $CO_2$ or the like from flue gas, by using the falling film reboiler 1101 as the reboiler of the regenerator, it is possible to provide the system for recovering carbon dioxide from flue gas, in which the reboiler of the regenerator can be installed compactly, there is less thermal decomposition of amine solution, and power of $CO_2$ compression facilities can be reduced.

Test Example

A $CO_2$ recovering system of 110-MW power generation facilities was compared with a conventional system as an example.

In this example, an amount of processed gas was set to $CO_2$ (54,800 kg/H), and a $CO_2$ recovery rate was set to 90%. An amount of recovered $CO_2$ was 49,300 kg/H.

Monoethanolamine was used as a $CO_2$ absorbent.

As for the operating pressure, the temperature was 135° C. and pressure was 182 kilopascals (G) in the falling film reboiler 1101, whereas the temperature was 131° C. and pressure was 153 kilopascals (G) in the conventional horizontal thermo-siphon boiler 1030.

A residence time was 7 seconds in the falling film reboiler 1101, whereas it was 150 seconds in the kettle-type reboiler 1040.

Power of a $CO_2$ compression system was 5750 kW in the falling film reboiler 1101, and it was 6100 kW in the conventional horizontal thermo-siphon boiler 1030 (the operating temperature was set to 123° C.).

Because a supply pump is required in the falling film reboiler 1101, when 115 kW is subtracted from the difference above, reduced power is 235 kW.

As shown in FIG. 2, a site area is $S=60$ $m^2$ in the falling film reboiler 1101, and it is $S_4=280$ $m^2$ (only around the regenerator and the reboiler) in the kettle type reboiler 1040, as shown in FIG. 7. Also a maintenance area ($S_5=280$ $m^2$) is required, and a total area of $S_6=560$ $m^2$ is required for the kettle type reboiler 1040.

In this manner, according to the present invention, the system for recovering carbon dioxide from flue gas can be provided, in which a reboiler of a regenerator can be installed compactly, there is less thermal decomposition of amine solution, and the power of $CO_2$ compression facilities can be reduced.

INDUSTRIAL APPLICABILITY

As described above, in the system for recovering carbon dioxide from flue gas according to the present invention, regenerated $CO_2$ absorbent is reheated by the falling film reboiler. Therefore, decomposition of the absorbent is reduced and the system is made compact. Accordingly, the system for recovering carbon dioxide from flue gas can be installed afterwards in a carbon dioxide recovering system in existing large power generation facilities that require a reduced installation area.

The invention claimed is:

1. A system for recovering carbon dioxide from flue gas, comprising:
    an absorber that brings $CO_2$ absorbent that absorbs $CO_2$ contained in flue gas exhausted from industrial facilities into contact with the flue gas to remove $CO_2$ from the flue gas;
    a regenerator that strips $CO_2$ from $CO_2$ absorbent that is fed from the absorber through a first feed line and has absorbed the $CO_2$ to regenerate $CO_2$ absorbent;
    at least two falling film reboilers that draw off $CO_2$ absorbent from near a bottom of the regenerator and reheats $CO_2$ absorbent via steam;
    a first liquid-vapor separator that separates $CO_2$ absorbent reheated by the falling film reboilers into $CO_2$ absorbent and vapor containing $CO_2$; and
    a second feed line for supplying separated $CO_2$ absorbent to the absorber.

2. The system for recovering carbon dioxide from flue gas according to claim 1, further comprising:
    a condenser that condenses water vapor from $CO_2$ gas carrying water vapor, extracted from a top part of the regenerator;
    a second liquid-vapor separator that separates condensed water vapor; and
    a $CO_2$ compressor that compresses $CO_2$ gas separated by the second liquid-vapor separator to acquire high-pressure $CO_2$ gas.

3. The system for recovering carbon dioxide from flue gas according to claim 1, wherein the falling film reboiler includes a channel cover for maintenance provided on the top thereof.

4. The system for recovering carbon dioxide from flue gas according to claim 1, wherein a reboiler system is constituted by the at least two falling film reboilers and one first liquid-vapor separator that separates falling liquid from the falling film reboilers into vapor and liquid, and a plurality of the reboiler systems are arranged for one regenerator.

* * * * *